United States Patent [19]

Stokes

[11] 4,416,046

[45] Nov. 22, 1983

[54] METHOD OF BINDING SHEETS USING STITCHERS

[75] Inventor: Ronald E. Stokes, Newport Pagnell, England

[73] Assignee: Xerox Corporation, Stamford, Conn.

[21] Appl. No.: 387,080

[22] Filed: Jun. 10, 1982

Related U.S. Application Data

[63] Continuation of Ser. No. 106,422, Dec. 21, 1979, Pat. No. 4,358,040.

[51] Int. Cl.[3] .............................................. B23P 17/00

[52] U.S. Cl. ..................................... 29/417; 29/432.1; 29/798; 29/526 R

[58] Field of Search ...................... 29/432, 417, 432.1, 29/798; 227/5, 84, 3, 4, 6, 7, 85, 88, 152, 155; 83/205

[56] References Cited

U.S. PATENT DOCUMENTS

| | | | |
|---|---|---|---|
| Re. 5,696 | 12/1973 | Blake et al. | 227/5 |
| Re. 13,967 | 8/1915 | Juengst | 227/84 |
| 1,048,134 | 12/1912 | Cosgrain | 227/5 |
| 1,450,164 | 4/1923 | Bates | 227/5 |
| 3,499,592 | 3/1970 | Cooper | 29/432.1 X |
| 3,613,217 | 10/1971 | Perkins | 29/432.1 X |
| 3,753,523 | 8/1973 | Perlman | 227/84 |

FOREIGN PATENT DOCUMENTS

| | | |
|---|---|---|
| 651636 | 2/1929 | France . |
| 22251 | 2/1930 | United Kingdom . |
| 692106 | 5/1953 | United Kingdom . |
| 781017 | 8/1957 | United Kingdom . |

*Primary Examiner*—Charlie T. Moon
*Attorney, Agent, or Firm*—Bernard A. Chiama

[57] ABSTRACT

A wire stitcher includes a cutter for cutting a length of wire W from a supply thereof and a stitcher head having a former and driver for forming and driving the length of cut wire for binding a set SS of sheets. The length of cut wire which is presented to the head by a wire advancing and cutting mechanism. The mechanism comprises a first wire gripper, which advances the wire through a fixed distance, and a compensating mechanism comprising a second wire gripper and a cutter block. These are moved towards each other to increase the wire length symetrically relative to the driver as a function of set thickness by an actuator connected to a set clamping device.

1 Claim, 12 Drawing Figures

Fig. 5.
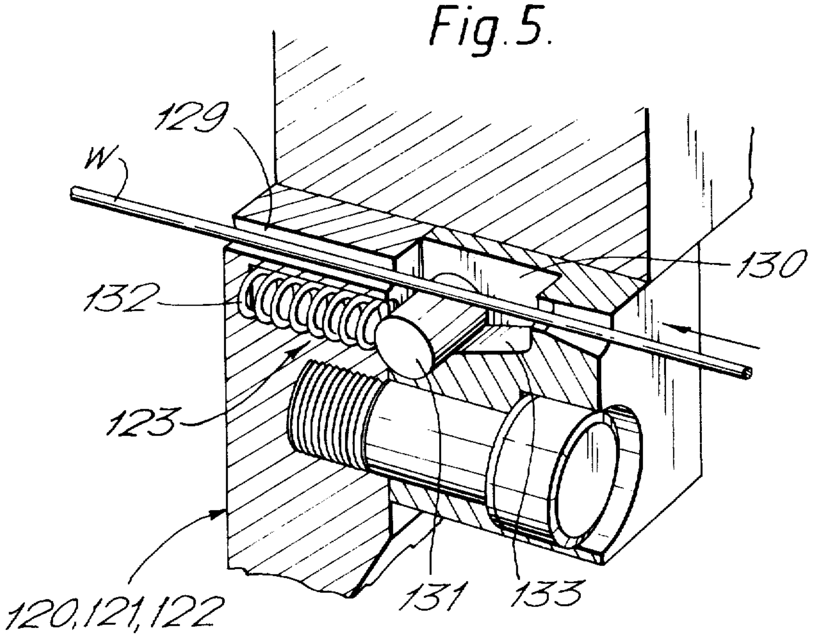
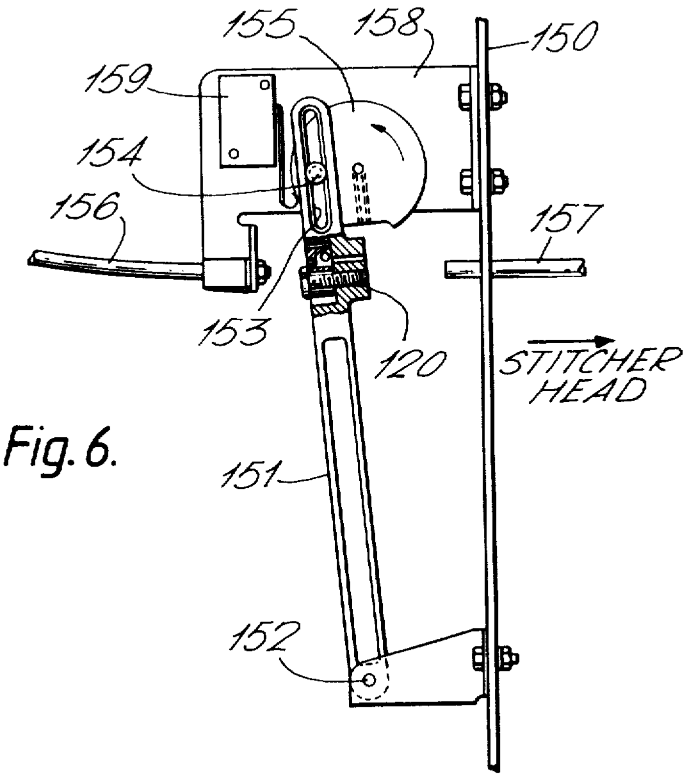
Fig. 6.

METHOD OF BINDING SHEETS USING STITCHERS

This is a continuation of application Ser. No. 106,422, filed Dec. 21, 1979, now U.S. Pat. No. 4,538,040, issued Nov. 9, 1982.

This invention relates to wire stitchers and particularly to such apparatus for binding sets or signatures of sheets or documents. Stitchers take various well-known forms. There are those (called staplers) which use preformed staples, those using pre-cut lengths of wire which are formed in the machine and those in which the staples are formed from a continuous wire wound on a spool from which pieces are cut and formed in the machine. In each case the legs of the formed staple or stitch are driven through the set until the crown of the staple legs are bent over against the opposite face of the set to form clinches. The present invention is concerned with stitchers of the kind in which the staples are formed from wire stock.

It will be understood that where the stitcher is capable of accommodating sets of varying thickness it is desirable to have some means of adjusting the length of wire used for forming the stitch and although it is possible to accommodate varying set thicknesses by permitting the clinches to vary according to the thickness of the set, even to the extent in some cases of angling the clinches so that they overlap for very thin sets, this imposes limits on the capacity of the machine and is also aesthetically undesirable. In order to avoid this, it has been proposed in our U.S. Pat. No. 4,356,947, and co-pending application U.S. Pat. No. 106,423, filed Dec. 21, 1979, respectively that the length of wire cut to form the stitch be determined automatically in dependence on the thickness of the set of sheets. In one form, the cutter is movable and the length of cut wire presented to the stitching head is automatically determined by advancing the wire by a distance dependent upon the thickness of the set and positioning the cutter in dependence upon the thickness of the set. In a specific form, this is achieved by inhibitor means which is automatically adjusted in dependence upon set thickness and acts as a stop for the cutter and for a gripper device by which the wire is advanced. As described in our aforesaid applications, in order to accommodate the variations in stroke of the gripper device and cutter, these are driven through a spring mechanism and for all except the thickest sets, potential energy storage in the spring is wasted, being dissipated without being used. Since most sets will commonly be thin rather than thick an alternative wire feed mechanism is proposed.

Thus, according to the present invention, there is provided a wire stitcher including a cutter for cutting a length of wire from a supply thereof and a stitcher head for forming and driving the length of cut wire for binding a set of sheets, comprising first means for advancing the wire through a fixed distance past the cutter and second means for further advancing the wire and positioning the cutter in dependence upon the thickness of the set.

Preferably, the wire is advanced by the first means past a normal or rest position of the cutter by a fixed distance (crown length plus twice clinch length) and thereafter the wire is advanced by the second means by a distance equal to the set thickness and the cutter is retracted from the rest position by a distance equal to the set thickness. However, given that there will be a minimum set thickness (two sheets) the constant may instead include twice the minimum set thickness in which case, in all cases except for a minimum thickness set, the wire will be advanced by the second means by a distance equal to the set thickness minus the minimum set thickness and the cutter will be retracted by the set thickness minus the minimum set thickness. This latter arrangement avoids the need to move the second means and the cutter at all when binding minimum thickness sets. In each case a cut wire of the required length is obtained which is automatically centred on the head.

In a preferred embodiment, the stitcher includes a first wire gripper for advancing the wire past the cutter by said fixed distance and a second wire gripper for further advancing the wire by a distance dependent upon the thickness of the set, a third wire gripper being associated with the cutter for gripping the wire during retraction of the first and second wire grippers. Movement of the second wire gripper and the cutter is controlled by an actuator positioned in dependence upon set thickness. The second wire gripper and the cutter are interconnected for equal and opposite movements along the wire paths e.g. by being slideably mounted and respectively connected to different ones of a pair of racks arranged to be driven by a common pinion in opposite directions, the pinion being rotatable by the actuator proportionately to the set thickness.

In another embodiment, the first means drives a wire gripper to advance the wire by said fixed distance and the second means drives the wire gripper by said further distance and retracts the cutter. Thus, a feed block is arranged to be driven through a fixed distance for advancing the wire by said fixed distance and the wire gripper is slideably mounted on the feed block for further advancing the wire in dependence upon set thickness.

The stitcher may be incorporated in a sheet stitcher/-compiler as part of a finisher for a photocopier and such a finisher may form part of the photocopier or take the form of a separate unit.

In order that the invention may be more readily understood, reference will now be made to the accompanying drawings in which.

Figure 1:
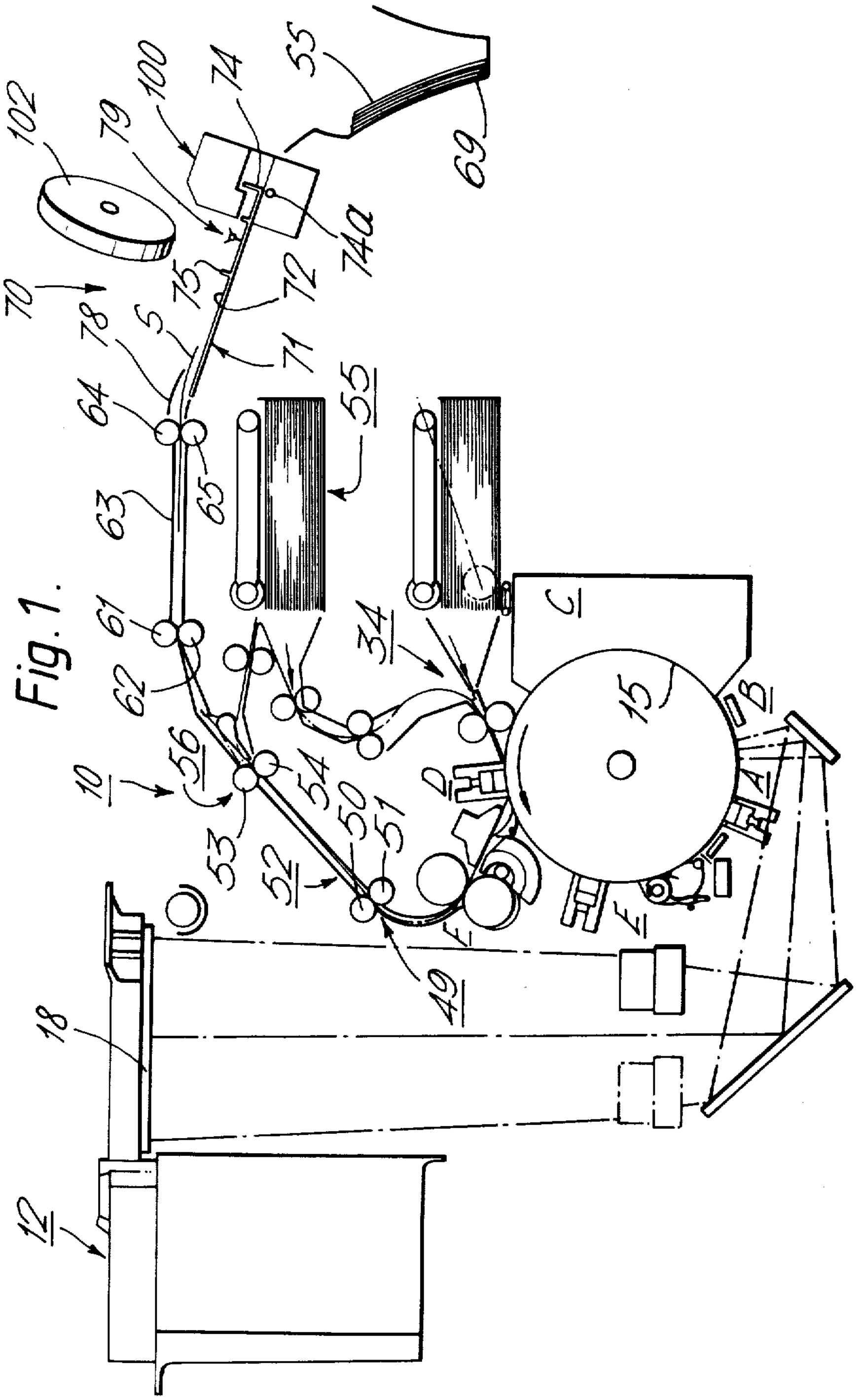
FIG. 1 is a schematic side elevation of an exemplary form of photocopier having a finisher incorporating a stitcher according to this invention.
Figure 4:
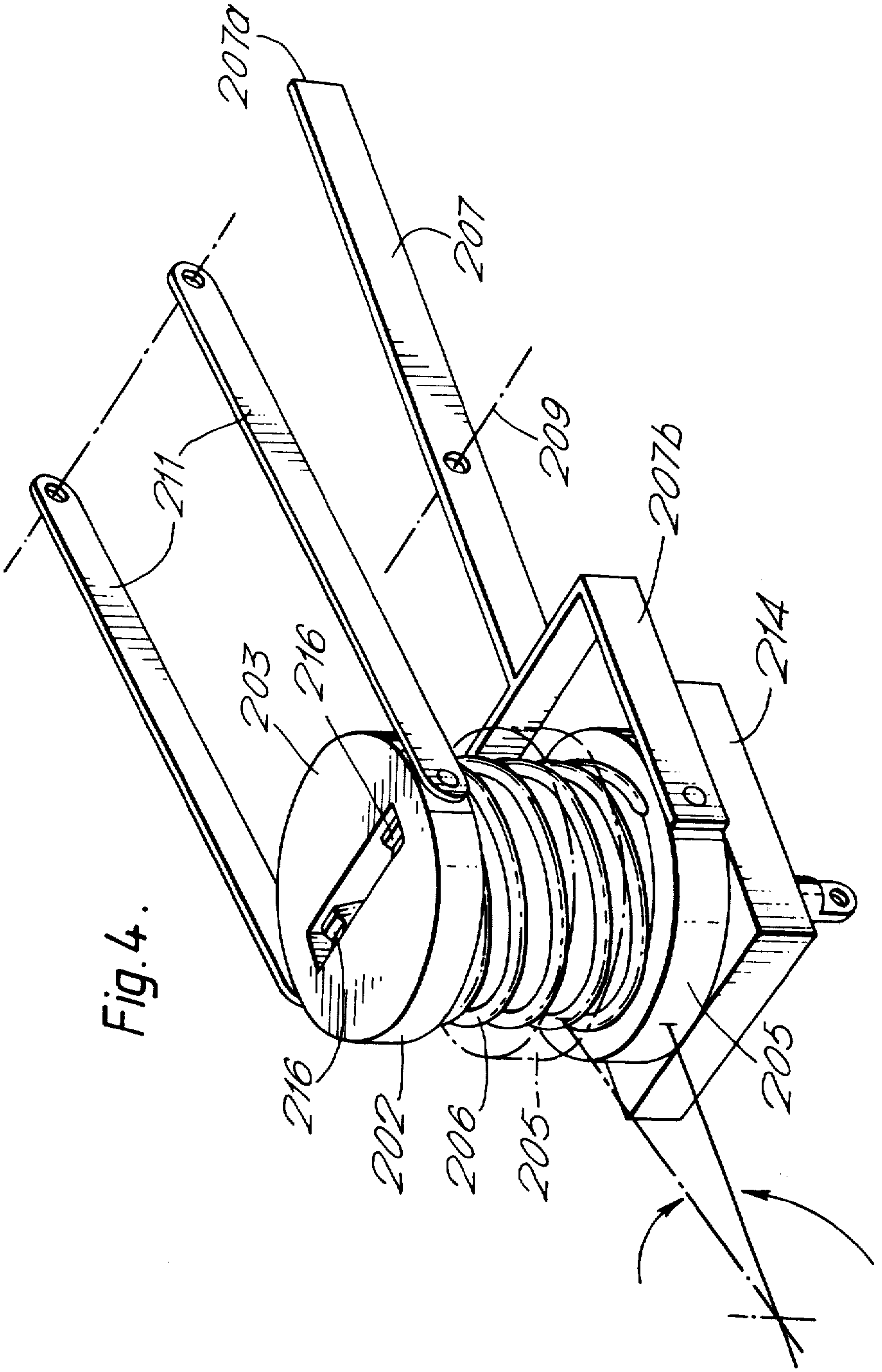
Figure 7:
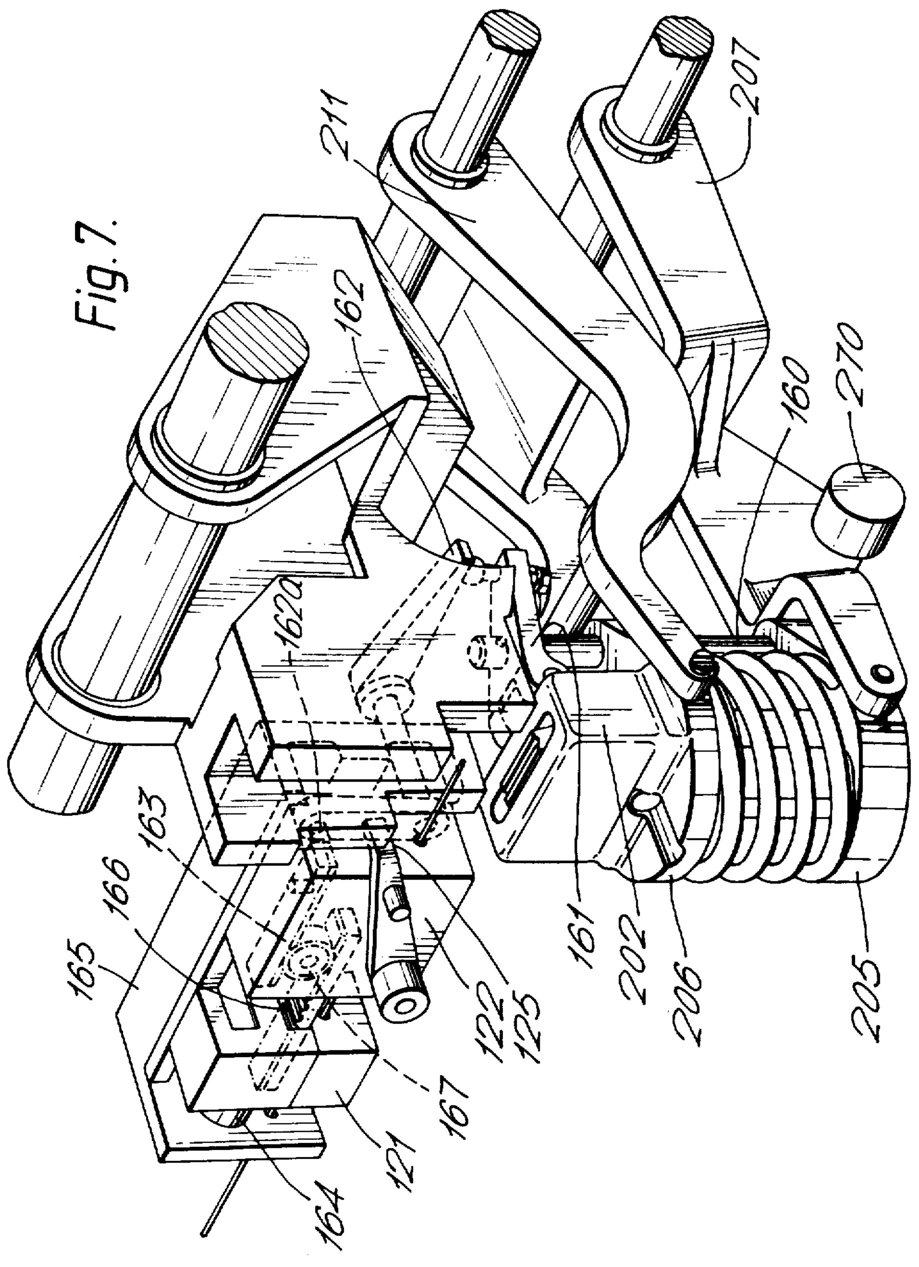
Figure 8:
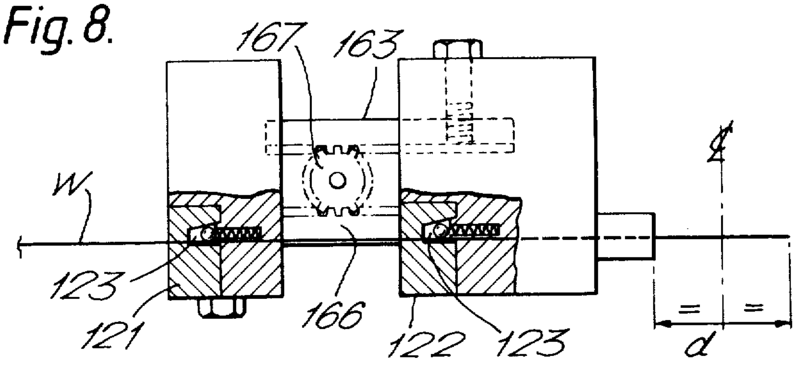
Figure 9:
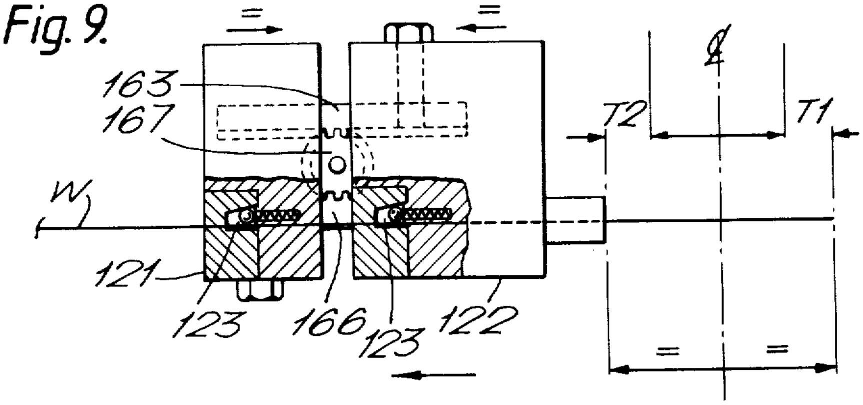
Figure 12:
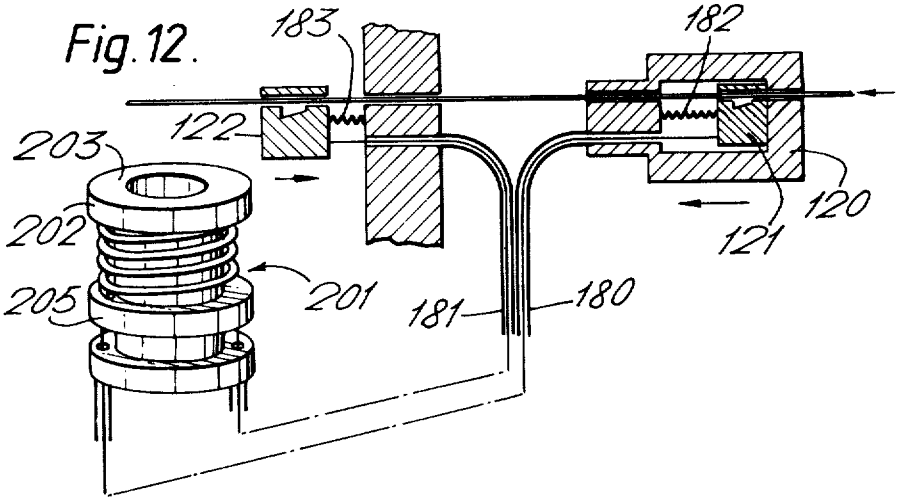
Figure 10:
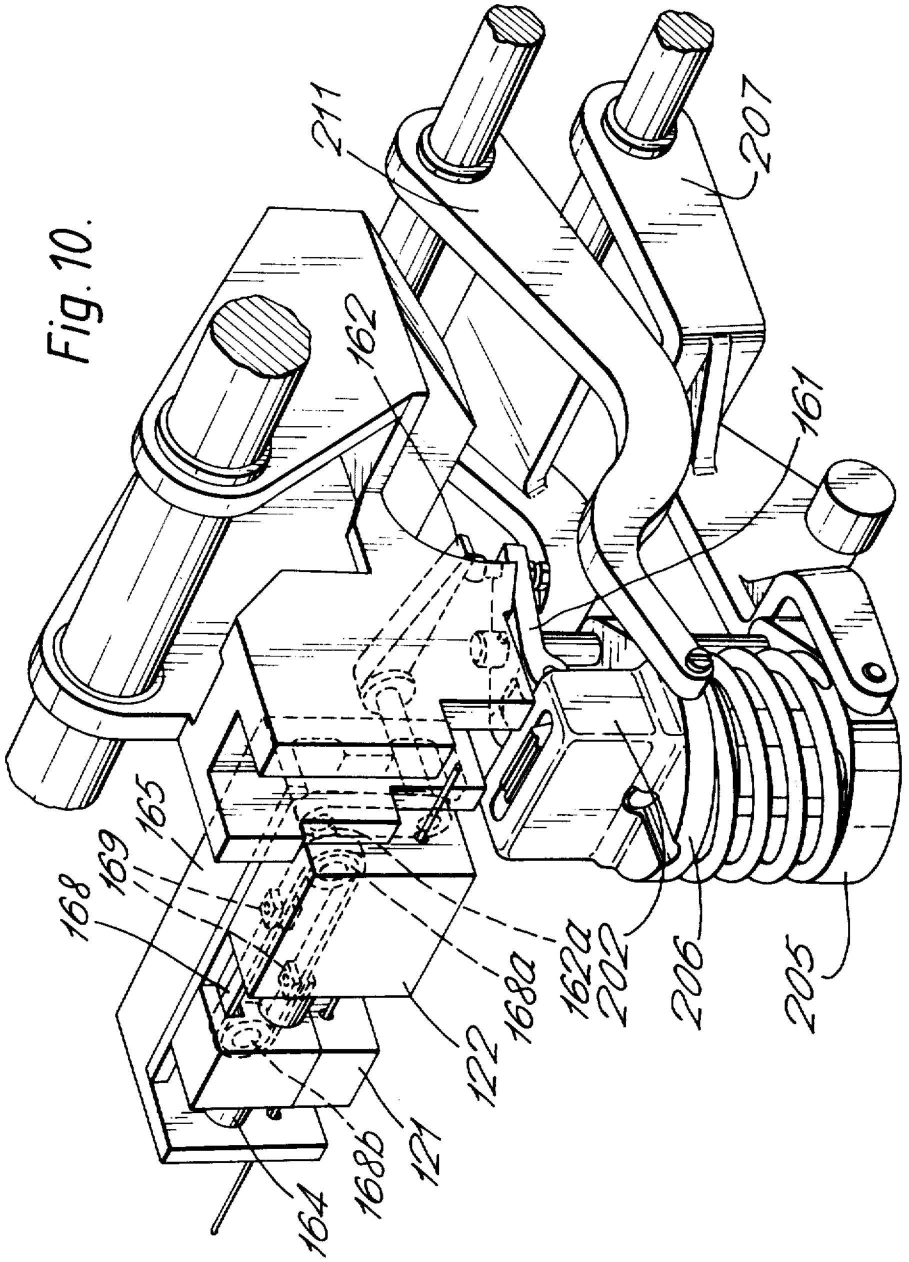
Figure 11:
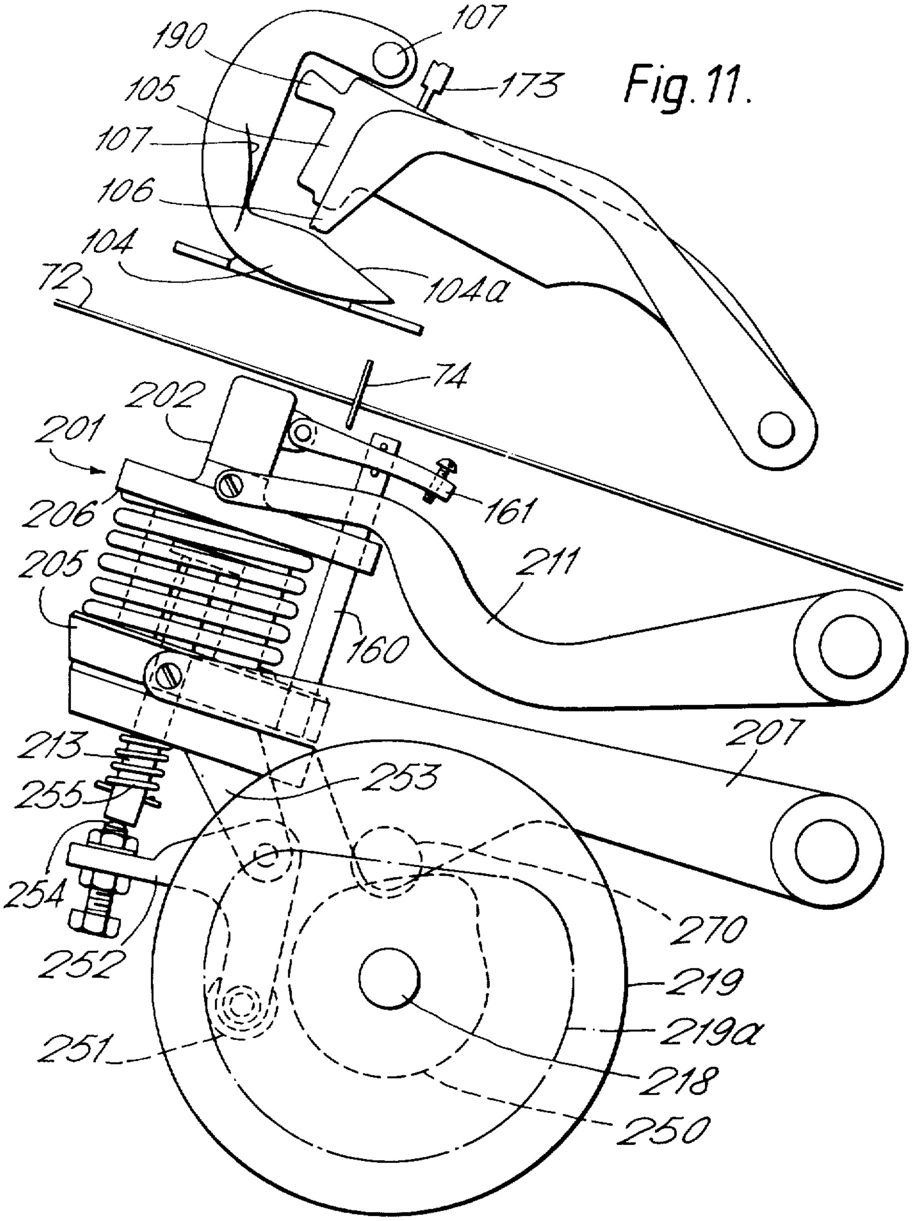

FIG. 4 is a schematic perspective view of the clincher showing the drive therefor, FIG. 5 is a sectional view illustrating a preferred form of wire diode for use in the wire feeder, FIG. 6 is a side elevation of the main or fixed distance feed mechanism, FIG. 7 is a perspective view of the stitcher head showing one form of proportional or secondary wire feed mechanism, FIGS. 8 and 9 illustrate schematically the operation of the secondary wire feed mechanism, FIG. 10 is a perspective view like that of FIG. 7 showing an alternative form of secondary wire feed mechanism, FIG. 11 is a side elevation of a second embodiment of stitcher suitable for use in the machine shown in FIG. 1, and FIG. 12 illustrates schematically another embodiment of wire advancing and cutting mechanism in accordance with the invention.

Referring to FIG. 1 there is shown an automatic xerographic reproducing machine 10 having a finisher 70 incorporating a stitcher 100 according to this invention. The copying machine 10 is capable of producing either simplex or duplex copies in sets from a wide variety of originals which may be advanced in recirculating fashion by recirculating document apparatus 12 described in U.S. Pat. No. 3,556,512. Although the present invention is particularly well suited for use in automatic xerography, the apparatus generally designated 100 is equally well adapted for use with any number of devices in which cut sheets of material are delivered or compiled in a set or stack.

The processor 10 includes a photosensitive drum 15 which is rotated in the direction indicated so as to pass sequentially through a series of xerographic processing stations: a charging station A, an imaging station B, a developer station C, a transfer station D and a cleaning station E.

A document to be reproduced is transported by document handling apparatus 12 from the bottom of a stack to a platen 18 and scanned by means of a moving optical scanning system to produce a flowing light image on the drum at B. Cut sheets of paper are moved into the transfer station D from sheet registering apparatus 34 in synchronous relation with the image on the drum surface. The copy sheet is stripped from the drum surface and directed to a fusing station F. Upon leaving the fuser, the fixed copy sheet is passed through a curvilinear sheet guide system, generally referred to as 49, incorporating advancing rolls 50 and 51. The advancing rolls forward the sheet through a linear sheet guide system 52 and to a second pair of advancing rollers 53 and 54. At this point, depending on whether simplex or duplex copies are desired, the simplex copy sheet is either forwarded directly to the finisher 70 via pinch rolls 61, 62 or into upper supply tray 55 by means of a movable sheet guide 56 before the finishing apparatus for the duplexed copy. Movable sheet guide 56, and associated advancing rolls are prepositioned by appropriate machine logic system to direct the individual sheets into the desired path.

The finisher 70 comprises a tray 71 having a base or support surface 72 inclined downwardly in the direction of sheet travel towards a registration corner defined by registration fences 74, 75 extending along the lower edge and one side of the tray. Above the upper end of the support surface is arranged a pair of coacting sheet feed rolls 64, 65 arranged to receive sheets fed along path 63 by pinch rolls 61, 62. From the feed rolls 64, 65, a sheet is directed by guide throat 78 towards the tray 71. A corner registration device 79 such as a paddle wheel like that described in U.S. Pat. No. 3,669,447 is arranged over the surface 72 to urge the sheets S into the registration corner to position them for receiving a stitch from the apparatus 100. The registration fence 74 is rotatable about an axis **74*a* so that it may be retracted for ejection of bound sets SS into a collection tray 69**. Any suitable ejection mechanism, such as drive rollers, may be employed.

Figure 3:
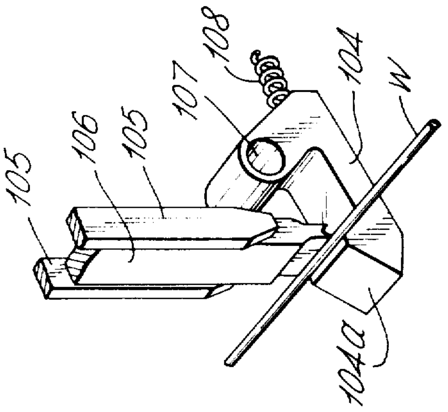
FIG. 3 is a scrap view of the stitcher shown in FIG. 2 illustrating schematically the relationship of various of its major parts.
Figure 2:
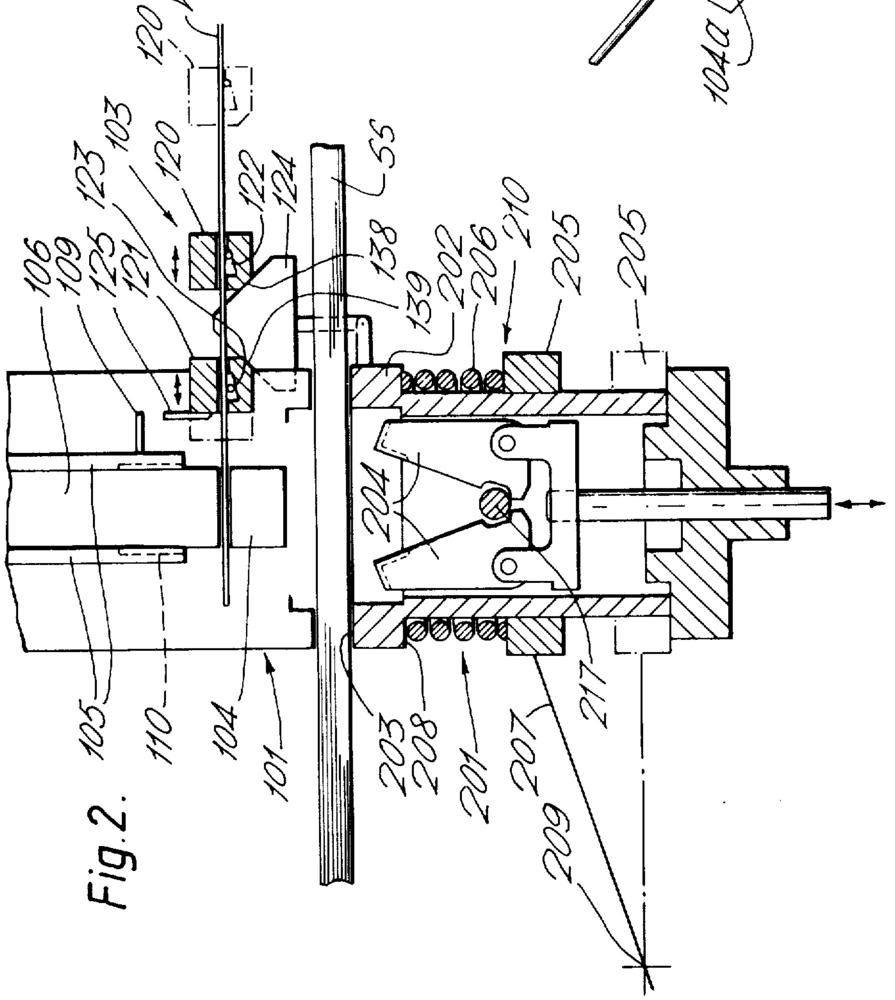
FIG. 2 is a schematic view illustrating the principles of one embodiment of stitcher of this invention suitable for use in the finisher of FIG. 1.

Referring now to FIGS. 2 and 3 of the drawings, the stitcher 100 comprises a stitcher head 101, a reel 102 (FIG. 1 from which wire W is supplied via a dancer (not shown) to the head 101 and an active clincher 201. The head 101 includes a wire advancing and cutting mechanism generally indicated at 103 for presenting lengths of cut wire to the stitcher head, an anvil 104 for supporting the wire, a former 105 including two elements at opposite sides respectively of the driver for forming the wire into a generally U-shape about the anvil and a driver 106 for driving the formed staple through the set SS. The clincher 201 comprises a clincher housing 202 having a clamping surface 203 by which a set SS may be clamped against the underside of the stitcher head 101 and containing clinch ears 204 arranged to receive and act upon staple legs driven through the set and into the housing through a slot in the surface 203.

In FIG. 2, the clincher 201 is shown in its operative position with a set SS positioned against the head 101 which is fixed in position above the compiler tray. It will be understood, however, that during compilation of the set, the clincher is lowered so that the clamping surface 203 is below the support surface 72 of tray 71. During a stitching operation the clincher 201 is raised to lift the set SS against the underside of the head 101 and clamp it in position. Variations in set thickness are accommodated by the drive mechanism 210 by which the clincher housing is raised to lift the set against the underside of the stitcher head and clamp it into position to receive a stitch. This mechanism comprises a force applying ring 205 which lifts the housing via a compression spring 206, being moved through a fixed distance by a lever 207 (see FIG. 4). The spring 206 is positioned between the force applying ring 205 and a shoulder 208 and the lever 207 which is arranged to pivot about axis 209 is actuated by a cam (not shown) which acts on its free end **207*a*. As shown in FIG. 4 the other end of the lever is bifurcated to form a yoke 207*b* which is pivotally connected to the force ring 205. The clincher housing 202 is supported and guided by a pair of arms 211 pivotally connected between the housing and the frame of the stitcher. The mechanism 210 in addition to accommodating varying set thicknesses, varies the clamping pressure applied to the set as a function of set thickness. Thus, the thinner the set the less the compression of spring 206 and the less the clamping force applied. The clincher ears 204 are positioned in fixed relation to the housing 202** so that they are always presented to the set in the same relation regardless of the set thickness.

The embodiment of FIG. 11 includes a modified drive for the force ring 205 in which as a space-saving measure, the lever 207 carries a cam follower 270 intermediate the force ring 205 and pivot axis 209 which is controlled by a face cam 219 the centre-line of the guideway of which is shown by the dash-dot line **219*a*. The cam 270 is mounted on a cam shaft 218**.

The wire advancing and cutting mechanism 103 comprises a primary or main feed mechanism consisting of movable wire advancing block 120 by which the wire is advanced by a fixed distance, a secondary or proportional feed mechanism consisting of movable wire advancing and cutter blocks 121, 122 and an actuator member 124 positioned by the clincher 201 in dependence on the thickness of the set of sheets SS. The blocks 120, 121, 122 include wire diodes 123 which grip the wire only against movement relative to the respective block in the direction opposite the wire advancing direction. Thus, the diodes grip the wire when the blocks are moved to the left in FIG. 2 but allow each block to be moved to the right along the wire while the other block(s) hold(s) the wire. At the start of a wire feed cycle, the blocks are positioned as shown in dotted lines in FIG. 2. To feed the wire W, the main advancing block 120 is moved to the left, its diode 123 gripping the wire, to advance the wire past the rest or start-of-cycle position of the cutter 125 by a fixed distance d made up of a constant (crown length plus twice clinch length). Thereafter, the secondary wire feed mechanism comprising the blocks 121, 122 is actuated, the block 121 further advancing the wire by a distance equal to the set thickness and the cutter block being retracted from its rest position by a distance equal to the set thickness further to uncover the wire by that amount. The movements of the secondary wire feed blocks 121, 122 and thus the length of wire W presented to the stitcher head 101 for severing by the cutter 125 are determined by the actuator member 124 which determines the movement of the blocks 121, 122 according to the thickness of the set. The blocks 120, 121 and 122 are shown in full lines in FIG. 2 in their final positions at the end of a wire advancing movement. As the mechanism recycles to its start position (which takes place at the end of the complete stitching cycle) the cutter block 121 returns to its rest position pulling the wire with it—so that the wire end is always in the same position at the start of a feed cycle—and the advancing blocks 120 and 121 traverse back along the wire to their rest positions.

In a preferred modification, block 120 advances the wire by a constant equal to crown length plus twice clinch length plus twice minimum set thickness and the blocks 121, 122 are each moved by a distance equal to the set thickness minus the minimum set thickness. With this arrangement the blocks 121, 122 are not moved at all during biding of a minimum thickness set.

The wire diodes 123 incorporated in the wire advancing and cutting blocks 120, 121, 122 are more fully illustrated in FIG. 5 from which it will be seen that the blocks 120, 121, 122 have bores 129 through which the wire W is threaded and which incorporate the wire diodes 123. The diodes comprise a cavity 130 along the bore 129 which contains a roller 131 lightly loaded by a spring 132. The face 133 of the cavity opposite the bore is inclined so that the cavity tapers in the wire advancing direction and the spring 132 urges the roller into engagement with the wire.

As schematically illustrated in FIG. 2 by the dotted lines, the actuator 124 is connected to the advancing and cutter blocks 121, 122 such that the vertical movement of the actuator is translated into equal and opposite movements towards one another of the blocks along the wire. Suitable mechanisms for achieving this are described below with reference to FIGS. 7 to 9 and 10.

The length of wire presented to the stitcher head 101 by the mechanism 103 is cut, formed and driven in the following manner. While the anvil 104, which is pivotally mounted at 107 and biassed to its start-of-cycle position by a spring 108 as shown in FIG. 2, is held against movement, the driver 106 is moved downwardly against the wire to clamp it in position on the anvil. The former elements 105 then start moving downwardly. Initial movement of the former operates the cutter 125 through actuator 109 to sever the required wire length and further movement thereof shapes the wire about the anvil 104 into a generally U-shaped. In order to accommodate the wire during this operation, the formers have guide grooves 110 along their inner faces. At the end of the forming operation the former is in its lower limit position with the lower ends of the former elements 105 below the underside of the anvil 104 and adjacent the set. The driver 106 is now driven downwardly, pivoting the anvil about its axis 107, to drive the formed staple. As seen in FIG. 3, the anvil includes a sloping surface 104*a*. During the driving operation, the anvil surface 104*a* forms a support for the crown of the staple. Similarly the former elements serve to support the legs of the staple in the grooves 110 during the driving movement.

It will be realised from the foregoing that the anvil must be held against movement during the cutting and forming stage but be pushed out of the way during the driving stage. This may be achieved by using a spring 108 which is strong enough to hold the anvil stationary during cutting and forming. However, this requires that the force available to drive the driver must be sufficient also to overcome the resistance of the spring. It is preferred therefore that as described with reference to our copending application U.S. Ser. No. 106,324, filed Dec. 21, 1979, respectively, the anvil be held locked in position during the cutting and forming stage and released by the former 105 at the end of its travel whereby only a relatively light spring 108 is required which is sufficient to return the anvil to its start-of-cycle position and to ensure that the anvil supports the staple crown during the driving stage. One way of achieving this is shown in FIG. 11 in which the anvil is geometrically locked in position during the cutting and forming steps by arranging the pivot axis 107 above the line of pressure engagement between driver and anvil, the lock being released by a projection 190 on the former engaging an actuator surface 170 on the anvil support area.

As described above, the stitcher has a two stage driver action in which following wire feed a first stage motion operates to grip the wire W against the anvil 104 during cutting and forming and a second stage motion acts following forming to effect driving of the formed staple. A mechanism suitable for this operation based on pivoted motions which first holds the wire against the anvil and then provides the driving motion all from one continuous input lever travel is described in our U.S. Pat. No. 4,335,841.

The ends of the staple legs are turned over and wiped flat against the underside of the set by the clincher ears 204. The clincher 201 is operated as described more fully in our U.S. Pat. No. 4,328,919, so that the staple legs having passed through the set move through air and meet no further resistance during driver travel. This is achieved by arranging the clincher ears out of the paths of the staple legs during driver travel so that leg wander is accommodated wholly within the clinch ears by profiling the ears with a groove wide enough to accommodate the maximum leg wander anticipated. The drive to the clincher ears may be by a spring which is located during return motion of the clincher housing at the completion of a stitching operation as more fully described in our U.S. Pat. No. 4,358,042, the clinch ears being held latched in the position shown in FIG. 2 prior to the operation thereof, or by a cam drive 250 as illustrated in FIG. 11 where the clincher rod 213 is driven by an edge or ramp cam 250 mounted on the same drive shaft 218 as, and alongside, the cam 219 which drives the force-ring lever 207. The drive to the clincher rod from the cam 250 is effected by a roller follower 251 mounted on one end of a crank arm 252 pivoted to a bracket 253 depending outwardly from the clincher housing 202. The other end of the crank arm carries a stop 254 which engages the bottom end of the clincher rod 213. As shown, the stop 254 is adjustable to permit setting of the clincher ear movement. The clincher ears 204 are biassed to their open, retracted position by a spring schematically represented at 255. The cam shaft 218 is driven in synchronism with the head 101 drive and the cam 250 is disposed so that the clincher rod is driven only after the formed staple has been completely driven through the set. It will be noted that by the using a drive arrangement as shown with the face cam 250, variations in set thickness are accommodated without affecting the timing (except to an insignificant degree caused by slight variations in the position of the cam follower 251 to cam 250) of the clincher ear movement relative to that of the driver.

The wire advancing and cutting mechanism 103 is more fully illustrated in FIGS. 6 to 9. The main wire advancing mechanism 120 by which the wire is advanced a fixed distance is shown in FIG. 6 and is arranged upstream of the secondary or proportional wire advancing and cutting mechanism 121, 122 which is mounted on the stitcher head as shown in FIG. 7. The main wire feed block 120 is incorporated in a crank 151 pivoted at its lower end 152 to the frame 150 of the stitcher and having a slot 153 at its other end engaged by a pin 154 on a drive plate 155 rotation of which oscillates the crank 151 about pivot 152. The block 120 is aligned between a flexible wire guide tube 156 extending from the wire reel and a rigid wire guide tube 157 leading to the stitcher head. To advance the wire by fixed distance d, the drive plate 155 is driven through a single revolution by a drive motor mounted on the back of bracket 158, the motor being controlled by a microswitch 159. The wire is advanced during the first half revolution of the plate 155 and as the crank returns, the wire is gripped against return movement by the diodes in the blocks 121, 122.

The wire is further advanced and the cutter 125 positioned by the secondary or proportional wire feed mechanism shown in FIGS. 7 to 9. As explained above movement of the secondary blocks 121, 122 is effected in response to movement of an actuator 124 which itself is proportional to set thickness. As shown in FIG. 7 and also FIG. 11, the actuator 124 includes a rod 160 fixed to the force ring 205 and slideably mounted in a guide in the clincher body 206. The vertical movement of the rod 160 is translated into horizontal sliding movement of the blocks 121, 122 along the wire by the following mechanism. The rod 160 raises and lowers a lever 161 pivoted to the clincher housing 202 and this in turn actuates a crank 162 which drives a rack 163 via a drive **162*a*. The rack 163 is fixed to the cutter block 122. The cutter block 122 and the proportional feed block 121 are slideably mounted on a guide rail 164 carried by a support 165 for movement towards and away from each other along the wire path. A second rack 166 fixed to the feed block 121 is connected to rack 163 via a pinion 167 rotatably mounted on support 165. As will be seen from FIG. 7, lifting of the rod 160 causes the rack and pinion 163, 166, 167 to move the feed and cutter blocks 121, 122 towards each other by equal amounts, the movement of the blocks being proportional to the movement of the actuator rod 160**.

For a minimum thickness set, as illustrated in FIG. 8, the wire is advanced by the main feed block 120 but the actuator rod 160 moves insufficiently to operate the crank 162 and the feed blocks 121, 122 remain stationary so that the wire fed is solely that advanced by the main feed block. As shown, this wire is centred about the centre-line CL of the stitcher head. For a thicker set the actuator rod 160 operates crank 162 which in turn causes rack and pinion 163, 166, 167 to draw the blocks 121, 122 together as shown in FIG. 9 so that additional amounts of wire T1, T2 equal to the set thickness are uncovered beyond the cutter block 122 by the movements of the blocks 121,122 respectively. Since the cutter block is retracted equally to the advance of the feed block 121, the wire fed remains centred about the centre-line CL of the stitcher head.

In a modification as shown in FIG. 10, the rack and pinion is replaced by an endless belt 168 entrained over rollers **168*a*, 168*b* mounted on the support 165 and to opposite runs of which the blocks 121, 122 are respectively secured by clamps 169. The crank 162 drives roller 168*a***.

In a specific embodiment, the stitching wire (0.6 to 0.7 mm diameter) is supplied on a 300 mm diameter moulded spool having a capacity of 2 Kg of wire or approximately 40,000 stitches. The main wire feed supplies a 23.5 mm length of wire and the proportional wire feed accommodates sets up to 7.5 mm thick. The main feed is effected in 150 ms outside the stitching cycle of 300 ms. Proportional wire feed of course takes place during the main stitching cycle. In another embodiment schematically illustrated in FIG. 12, the secondary or proportional wire feed block 121 is slideably mounted on the main wire feed 120 and the two feed blocks share the same wire diode (gripper) 123. During the main or fixed distance feed, the main and secondary feed blocks 120, 121 move as a single unit, and may be driven for example by a drive as shown in FIG. 6 or by a cam. The required movement of the proportional wire feed and cutter blocks 121, 122 is effected by Bowden cables 180, 181 connected between the respective feed blocks and the force ring 205 of the clincher. Springs 182, 183 serve to return the blocks 121, 122 to their rest positions at the end of a feed cycle. It will be noted that the two Bowden cables are connected to diametrically opposite points on the force ring to equalise the forces on the ring.

Whilst specific embodiments of the invention have been described above it will be understood that various modifications may be made to the specific details referred to herein without departing from the scope of the invention as defined in the appended claims. Thus, the principles of this invention although described in relation to a flat bed stitcher may equally be applied to a saddle stitcher.

Further, while in the apparatus described above the stitcher is fixed in position, it may be movable for varying the position of the stitch or for inserting more than one stitch in a set. Also, two or more stitchers according to the invention, which may themselves be movable, may be operated in tandem, in which case various of the drive elements may be common to avoid duplication.

It will also be understood that while in the embodiments described, the stitcher head is fixed, the clincher could be fixed and the clamping means be formed by the sheet receiving surface of the head itself.

It will further be understood that although the embodiments of stitcher described and illustrated show the stitcher head above the clincher, the stitcher may be arranged in any suitable orientation and specifically the clincher may be arranged over the stitcher head.

For clarity, it is to be noted that the term staple is used herein to mean either a wire-fastener which is pre-formed outside the stitching machine or one which is formed within the machine.

The ends of the staple or stitch legs may be turned over by an active cylinder including ears which are wiped against the leg ends as described above or by a passive clincher having fixed guide surfaces. The advantage of an active clincher is that the legs are wiped flat against the set.

Although in the embodiments described herein, the constant by which the wire is advanced is either crown length plus twice clinch length or crown length plus twice clinch length plus twice a minimum set thickness, it will be understood that various other permutations are possible. Furthermore, the cut wire length may be varied so as to produce a constant clinch size regardless of set thickness or the clinch size may be variable as a function of set thickness, being longer for thicker sets.

What is claimed is:

1. A method of binding a set of sheets comprising cutting a piece of wire from a supply of wire, forming said cut wire into a staple, and driving said staple through a set to bind the sheets together, the improvement including the step of determining the length of said piece of wire automatically in accordance with the thickness of said set of sheets, said step of determining being effected by the step of advancing the wire by a fixed distance and then further advancing the wire by a distance dependent upon the thickness of the set and the step of positioning a wire cutter in accordance with the thickness of the set.

* * * * *